United States Patent
Nishioka

[15] 3,697,946
[45] Oct. 10, 1972

[54] SEQUENTIAL FLASH TYPE DIRECTIONAL SIGNAL DEVICE FOR AUTOMOBILES

[72] Inventor: Kenichi Nishioka, Tajimi-shi, Japan

[73] Assignee: Imasen Electric Industrial Co., Ltd., Aichi-ken, Japan

[22] Filed: Oct. 28, 1969

[21] Appl. No.: 871,834

[30] Foreign Application Priority Data

Nov. 14, 1968  Japan .................. 43/83492
Feb. 4, 1969  Japan .................. 44/10084

[52] U.S. Cl. ........................... 340/82, 340/251
[51] Int. Cl. ............................................ B60q 1/38
[58] Field of Search ........................... 340/80, 82

[56] References Cited

UNITED STATES PATENTS

| | | | |
|---|---|---|---|
| 3,398,399 | 8/1968 | Brock | 340/82 |
| 3,470,531 | 9/1969 | Hayden et al. | 340/82 |
| 3,474,410 | 10/1969 | Ivec | 340/82 |
| 3,500,312 | 3/1970 | Stantovich | 340/67 |
| 3,500,315 | 3/1970 | Shimada | 340/82 |
| 3,304,381 | 2/1967 | McAnespey | 340/71 UX |
| 3,541,506 | 11/1970 | Motoyasu et al. | 340/82 X |

FOREIGN PATENTS OR APPLICATIONS 1,154,970  6/1969  Great Britain ............ 340/82

Primary Examiner—Kenneth N. Leimer
Attorney—Fidelman, Wolffe & Leitner

[57] ABSTRACT

A sequential flash type directional signal device for automobiles, comprising a pair of series of lamps for indicating the direction of a turn to right or left respectively which are so arranged as to be flashed sequentially one after another in either direction, the control system permitting the flashing of lamps by means of simple delay circuits in combination with switching circuits, and the use of such circuits as a hazard warning circuit.

3 Claims, 7 Drawing Figures

SEQUENTIAL FLASH TYPE DIRECTIONAL SIGNAL DEVICE FOR AUTOMOBILES

This invention relates to a flashing directional signal device for automobiles, and more particularly to an improved sequential flash type directional signal device, which comprises a pair of series of lamps arranged in a row so as to be flashed sequentially in given order for indicating the direction of a turn to right or left.

Turn signal devices of this type enable car drivers to clearly recognize the direction of a turn to right or left clearly without confusing the signal for a brake lamp etc., and are very useful with respect to safety, particularly in high-speed driving. Similar devices presently in use require oscillators such as free-running multivibrators and flip-flop circuits combined with complicated relay circuits, which have such drawbacks as faulty operation, frequent troubles with so complicated circuits as a whole, and difficult adjustment and repair.

There is a relatively simple conventional device where a rotary switch is rotated by a motor. However, noises and sparks are produced which may cause interference with radio waves, and about half of the entire structure is formed of mechanical components, which produce friction causing frequent troubles and power consumption is high. Such a device is therefore not so preferable for practical use.

A primary object of this invention is to eliminate these disadvantages and improve prior-art mechanical or static devices as described above by adopting a static structure provided with electronic means as the control system of a device of this invention.

In conventional devices as described above, flash control means are prevented from operating by electrical troubles such as the breaking of wire occurring in a lamp circuit and only the lamp trouble is extinguished. Under this condition all other lamps are maintained lit, and thus the breaking of a wire is not noticed quickly inside a car.

Another object of this invention is to eliminate such inconvenience by informing a driver of a car of a malfunction such as a break in the wire in any lamp circuit.

Still another object of this invention is to provide a very simple and economical hazard warning device by making use of the lamp circuits for directional indication.

This device is used in a sequential flash type directional signal arrangement for automobiles comprising right and left turn signal lamp sets each consisting of a few lamps arranged in a row, and having a control circuit for flashing such lamps in sequential order for indicating the direction of a turn to right or left. The present device includes a control circuit for flashing such lamps and comprises delay circuits for controlling a second lamp and the following lamps, respectively, the said main control circuit controlling such delay circuits and a first lamp by means of time limit switches. The delay circuits are so arranged as to light the first, the second, . . . and the last lamp sequentially with a specific delay time given therebetween. The main control circuit which forms time limit switching circuits is connected to the first lamp and the delay circuits, respectively, so as to put out all the lamps already lit after a specific delay time and reset the entire system. The main control circuit comprises two switching transistors, a main control relay having a normally closed contact, and CR series circuits. The two switching transistors and said main control relay are so arranged as to form a three-stage control circuit with the main control relay as the final stage, and said CR series circuits are inserted for the switching of the transistors provided therebetween respectively with a specific time delay. The relay contact is opened to turn off and reset said first lamp and each of the delay circuits as a whole with input applied after a specific delay time when all the lamps are lit. The relay contact is closed again to apply input to each of such circuits after a specific delay time when all the lamps are extinguished.

Furthermore, this invention permits detection of any disconnection in such lamp circuits for lighting the lamps sequentially in given order by means of relays inserted therein to suspend flashing operation by controlling the lamp circuits, said detection being made by pilot lamps provided inside a car.

Still further, this invention provides a hazard warning circuit which is formed by specific lamps which are controlled by means of ganged switches.

Referring now to the drawings, the preferred embodiments of this invention will be explained. In the drawings.

Figure 1:
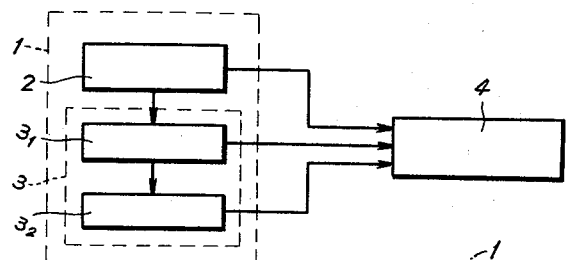
FIG. 1 is a schematic explanatory of the principle of a sequential flash type directional signal device for automobiles in accordance with this invention.

FIG. 1 is a diagram explanatory of the principle of the device for flashing three right turn signals and three left turn signals, showing a lamp circuit 4 which is controlled by a lamp control circuit 1 consisting of a delay circuit 3 and the main control circuit 2 for controlling the delay circuit 3.

The delay circuit 3 consists of a first delay circuit $3_1$ and a second delay circuit $3_2$ connected therewith. After lighting a first lamp immediately without delay by means of the main control circuit 2, a second lamp is lit with a predetermined delay by means of the first delay circuit $3_1$, and then, a third lamp is lit by means of the second delay circuit $3_2$ after a predetermined delay time.

After the first to the third lamp have been lit and a predetermined time has expired, all of them are put out by means of the main control circuit 2. With all the lamps reset, the same operation is repeated for lighting them sequentially again.

Figure 2:
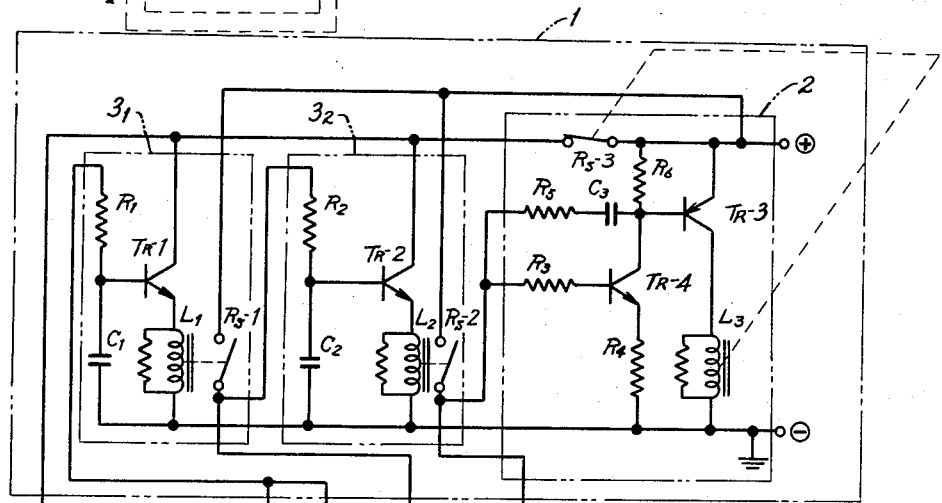
FIG. 2 is a circuit diagram of one embodiment of this invention.

The first and second delay circuits $3_1$ and $3_2$, as shown in FIG. 2, are formed of switching transistors Tr-1 and Tr-2 connected at the input to CR circuits, such as C1R1 and C2R2, and connected at the output to relay coils L1 and L2 provided with normally opened contacts Rs-1 and Rs-2, respectively. The time constant of such CR circuits is predetermined. These circuits are so arranged that when C1 or C2 is fully charged, the switching transistor Tr-1 or Tr-2 starts to operate (is brought into its "on" state), and current from a power source flows through the coil L1 or L2, forcing the normally opened contact Rs-1 or Rs-2 closed.

The lamp circuit 4, as shown in FIG. 2, is so arranged that right and left turn signal lamps consisting of set P1, P2, P3 and set P1', P2', P3', respectively, are connected to the lamp control circuit 1, and are separated electrically by three ganged change-over switches S1, S2, S3. Such change-over switches are called turn signal switches and each has a neutral position between two other contact positions.

The lamps P1 to P3 and P1' to P3' are disposed on the right and left corner on the rear side of a car body in the same order with P1 and P1' set innermost. In FIG. 2 front signal lamps are omitted.

The lamps are connected at one terminal to the body, which is connected to the earth terminal — of a battery.

The first lamps P1 and P1' are connected at terminals to the non-grounded terminal + of the same battery (hereinafter called the power source + ) through the change-over switch S1 and a normally closed contact Rs-3 on a relay coil L3 to be described subsequently.

The second lamps P2 and P2' are connected at terminals to the power source + through the change-over switch S2 and the normally opened relay contact Rs-1 in said first delay circuit $3_1$.

The third lamps P3 and P3' are connected to the power source + through the change-over switch S3 and the normally opened relay contact Rs-2 in said second delay circuit $3_2$. Either of such lamps for right and left turns is lit with Rs-1 or Rs-2 closed.

Input to operate the first delay circuit $3_1$ is obtained by shunting the current which flows when said first lamp P1 or P1' is lit through a diode D1 or D2. With the input applied to the first delay circuit $3_1$ the switching transistor Tr-1 is switched on after a specific delay time, which is controlled by the C1R1 circuit, and current is supplied to the relay coil L1 to close the normally opened contact and light the second lamp P2 or P2'.

Input to operate the second delay circuit $3_2$ is obtained by shunting the current which flows when said second lamp P2 or P2' is lit. With the input applied to the second delay circuit $3_2$, which is similar to the first delay circuit, the C2R2 circuit, switching transistor Tr-2, and relay coil L2 are operated to close the normally opened contact Rs-2 and light the third lamp P3 or P3'.

Figure 3:
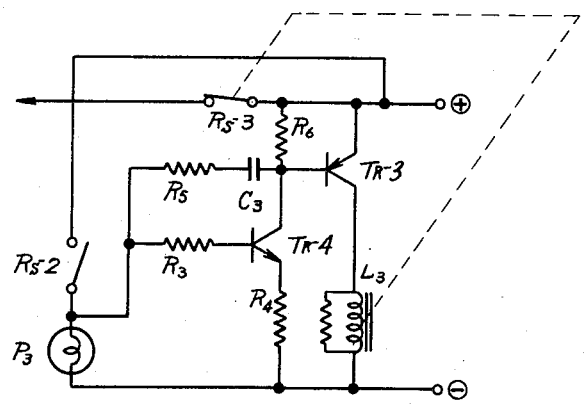
FIG. 3 is a circuit diagram of the main part of FIG. 2 which is a diagram of the main control circuit.
Figure 3:
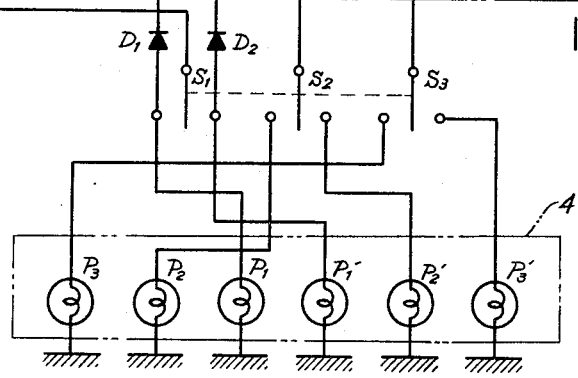

The main control circuit 2 of FIG. 2, which is shown typically in FIG. 3, supplies power source current through a first transistor (switching transistor) Tr-3 to the coil L3 of the main control relay to open the normally closed contact Rs-3.

To the input terminal of said first transistor Tr-3 is connected a bias resistance R6 between the base and the power source + and between the base and the power source earth − is connected a resistance R4 through a second transistor (switching transistor) Tr-4 for the control of base current through the first transistor Tr-3. To the base of the first transistor Tr-3 is also connected a capacitor C3 and a resistance R5 forming a CR series circuit, through which input (shunted current), produced when the third lamp is lit, is applied. Part of the input is given as base current to the second transistor Tr-4 through the base resistance R3.

The time constant of said CR series circuit formed of C3 and R5 is suitably chosen to determine the flashing time of the foregoing lamps.

The capacitor C3 is charged through resistances R6 and R5 initially when the device is operated and a charge thus stored therein is released through a discharge circuit formed of the resistances R6 and R5 and the relay contact Rs-2, which is obtained by closing said relay contact Rs-2 for lighting the third lamp.

The operation will now be explained. First turn the ganged change-over switches S1, S2, S3, used as turn signal switches to the side of the left turn lamps P1, P2, P3. The first lamp P1 is lit and input is applied to the first delay circuit $3_1$. With said input applied to the first delay circuit $3_1$, C1 is charged with the time constant of the C1R1 circuit. Upon completion of charging, that is, after a specific delay time, base current flows through the switching transistor Tr-1, which is then switched on; the current flows through the relay coil L1 and closes the normally opened contact Rs-1. Thus, the second lamp P2 is lit.

With the second lamp P2 lit the second delay circuit $3_2$ has input applied thereto likewise as in the first delay circuit $3_1$. C2 in the circuit is charged, controlling a specific delay time and, after charging, the switching transistor Tr-2 is operated to supply electricity to the relay coil L2 and close the normally opened contact Rs-2. Thus, the third lamp P3 is lit.

By making equal the time constants of the CR circuits in the first and the second delay circuit $3_1$ and $3_2$, the second and the third lamp are lit after the same delay time.

When the first to the third lamps have been lit, input is applied to the main control circuit 2, and base current flows through the resistance R3 and switches on the second transistor Tr-4.

With the second transistor Tr-4 switched on, the first transistor Tr-3 is made ready for operation. At the moment of switching on, the capacitor C3, already charged, causes a rise in the base voltage of the first transistor Tr-3 by closing the normally opened relay contact Rs-2 and applies a bias voltage reversely thereto. Thus, while the charge on the capacitor C3 is being released through the resistances R6 and R5, the first transistor Tr-3 is still maintained in its cut-off state. The discharge starts at the moment of application of the input.

When the discharge is finished after a specific time, said second transistor Tr-4, in its "on" state, conducts the base current through the first transistor Tr-3, which is consequently switched on to operate the coil L3 of the main control relay and open the normally closed contact Rs-3.

As a result, the first lamp P1 is put out and, at the same time, input to the first and the second delay circuits $3_1$ and $3_2$ is cut off and the normally opened contacts Rs-1 and Rs-2 are opened to put out both the second and the third lamps P2 and P3.

At this time the input introduced to the main control circuit 2 is cut off, and the second transistor Tr-4 is switched off. With current charging the capacitor C3 which continues to flow through the first transistor Tr-3 as base current said transistor Tr-3 is kept "on" until the capacitor C3 is almost fully charged, so as to maintain "off" the normally closed contact Rs-3 of said main control relay.

When charging the capacitor C3 is almost finished, the base current through the first transistor Tr-3 ceases flowing and it is switched off. Thus, the normally closed contact Rs-3 on the main control relay is closed, and the entire system returns to its initial state. The same operation as described above is again repeated for lighting the first lamp P1 to the third lamp P3 sequentially in given order.

By turning the ganged change-over switches S1, S2, S3 as turn signal switches to the side of right turn signal lamps P1', P2', P3', a like operation is performed in which lamps P1', P2', P3' are lit and put out sequentially in like manner.

Figure 4:
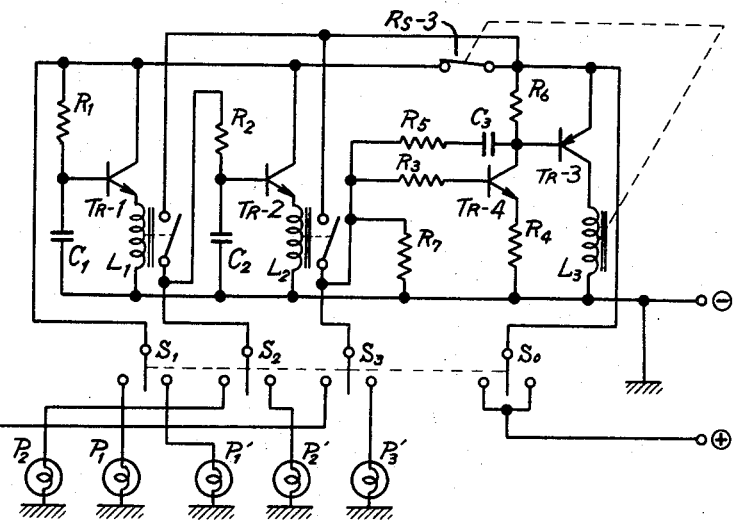
FIG. 4 is a circuit diagram of a second embodiment of this invention.

Another embodiment shown in FIG. 4 is almost the same as that of FIG. 2, but different in the following respects. A power source switch So is provided in conjunction with change-over switches S1, S2, S3, used as turn signal switches, for direct connection of the input terminal of the first delay circuit $3_1$ to a power source, not as through the change-over switch S1 and the diodes D1 and D2 in FIG. 2. In addition, a resistance R-7 forming a charging circuit is provided, and is different from FIG. 2, where charging the CR series circuit in the main control circuit is made through the lamp P3 or P3'. It will be clear that both of such circuits are considered equivalent in respect of their operation.

Figure 5:
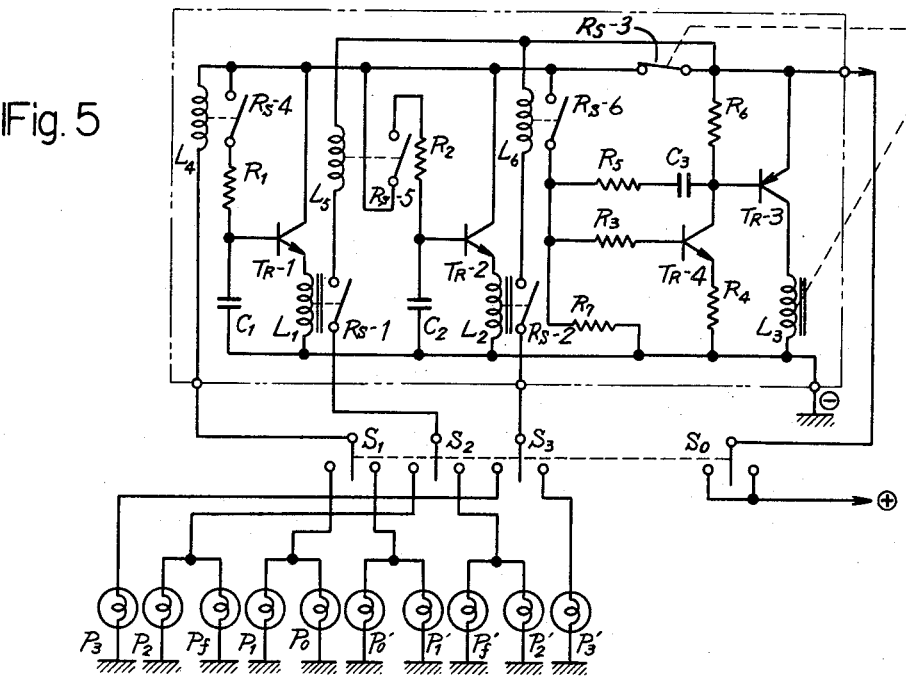
FIG. 5 is a diagram of a circuit similar to that shown in FIG. 4, which includes means for detecting any disconnection in the circuits and the lamps provided for indicating the direction of a turn.

A still another embodiment of FIG. 5 is a modification of the circuit of FIG. 4, where right and left turn signal lamps Pf, and Pf' used on the front of a car body, are provided in parallel with second lamps P2 and P2' respectively. Pilot lamps Po and Po' are provided in parallel with first lamps P1 and P1', respectively, inside said car, so that any disconnection or the breakage of wire in such lamp circuits may be detected in the car. Relay coils L4, L5 and L6 are inserted in the lamp circuits between the first to the third lamp and a power source + respectively, and their normally opened contacts Rs-4, Rs-5, Rs-6 are closed when these lamps are lit with power source current flowing therethrough so that the current may be shunted to first and second delay circuits $3_1$ and $3_2$ and the main control circuit 2 as input. In other words, when the first lamp is lit, input is applied to the first delay circuit $3_1$, and when the second or the third lamp is lit, input is applied to the second delay circuit $3_2$ or to the main control circuit 2.

In case there occurs any disconnection in the system for lighting the first lamp P1 or P1', or the second lamp P2 or P2', or the front turn signal lamp Pf or Pf' or the third lamp P3 or P3', current in the particular system with a disconnection is suspended with the result of the non-closure of contacts Rs-4, Rs-5, or Rs-6 and the absence of application of input to the first delay circuit $3_1$, the second delay circuit $3_2$, or the main control circuit 2. Thus, flashing operation is interrupted, and the pilot lamp Po or Po' in front of a driver's seat is kept lit. In case of such interruption of flashing operation the system having the trouble can be detected quickly by checking which lamp is kept lit.

The pilot lamps Po and Po', which are connected in parallel with the first lamps P1 and P1', require current so small as to be negligible in operation. Therefore, in the first lamp system the relay contact Rs-4 is designed for the capacity of the first lamp current as a standard. In the second lamp system and in the front turn signal lamp system the relay contact Rs-5 is designed to be operated by a difference between currents produced in case any disconnection occurs in either of the systems.

Figure 6:
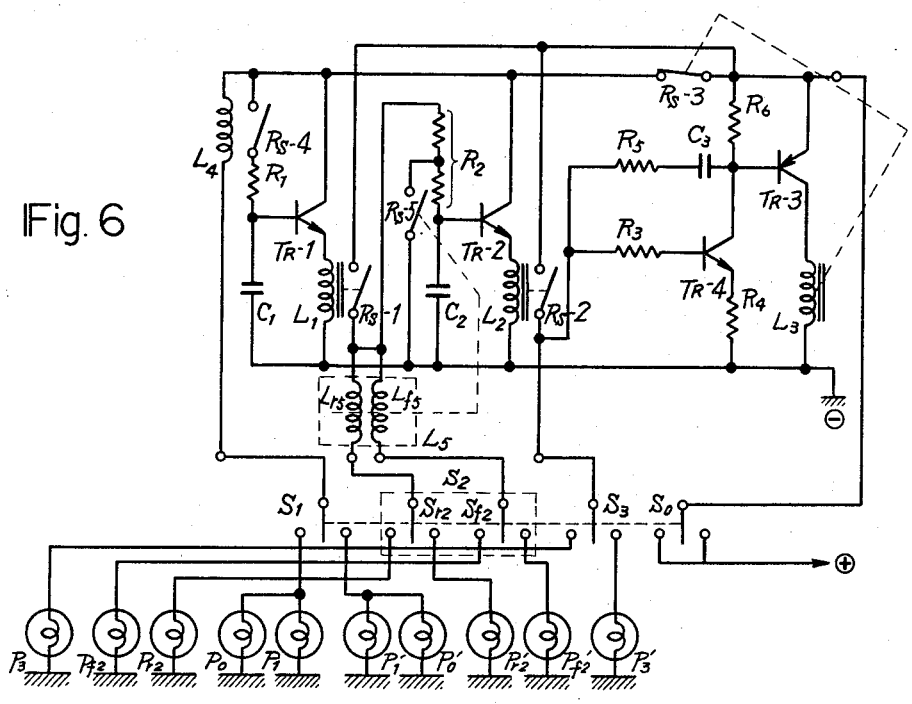
FIG. 6 shows a view similar to the diagram of FIG. 5, in which any disconnection can be detected independently by front and rear turn signal lamps.

FIG. 6 shows a further refinement of the circuit of FIG. 5. In the rear second lamp system and in the front turn signal lamp system shown in FIG. 5, the relays for detecting the breakage of wire as described above may produce faulty operation if used where vibrations are imparted thereto. In such a case the trouble cannot be detected by a driver. A solution to the problem is given by the circuit shown in FIG. 6.

In FIG. 6 second lamps P2 and P2' are separated from front directional signal lamps Pf, and Pf', and a changeover switch S2 such as a turn signal switch is divided into two parts Sr2 and Sf2. A relay coil L5 of a differential type is used and is formed of two coils Lr5 and Lf5. Both the front and the rear lamp systems are connected to a power source through the relay coils Lr5 and Lf5, as in FIG. 5. A relay contact Rs-5 (normally opened) is closed if and when magnetic flux in the relay coils Lr5 and Lf5 is made unbalanced due to any disconnection in either of the lamps and is connected to cut off input to a second delay circuit $3_2$. The relay (L6, Rs-6), for detecting the breakage of wire in the third lamp circuit, and the resistance R7, adapted to form a charging route in the CR series circuit in the main control circuit 2, both shown in FIG. 5, are omitted, and direct connection is made to the third lamp.

In FIG. 6, when any disconnection occurs in the rear second lamp system or in the front turn signal lamp system it can be detected, as in FIG. 5, with a lamp being kept lit in a system which has no trouble. In this manner detection can be made directly and very easily outside a car, and no faulty operation may be performed.

Furthermore, in the circuit of FIG. 6, no relay is used to detect any disconnection in third lamp as already described, but the operation is substantially equivalent to that with such a relay provided therein, because the resistance R7, used to form a charging route is not used in the main control circuit 2. The charging route of FIG. 6, being cut off by any disconnection in the third lamp circuit, will result in interrupting the operation of the main control circuit 2.

Figure 7:
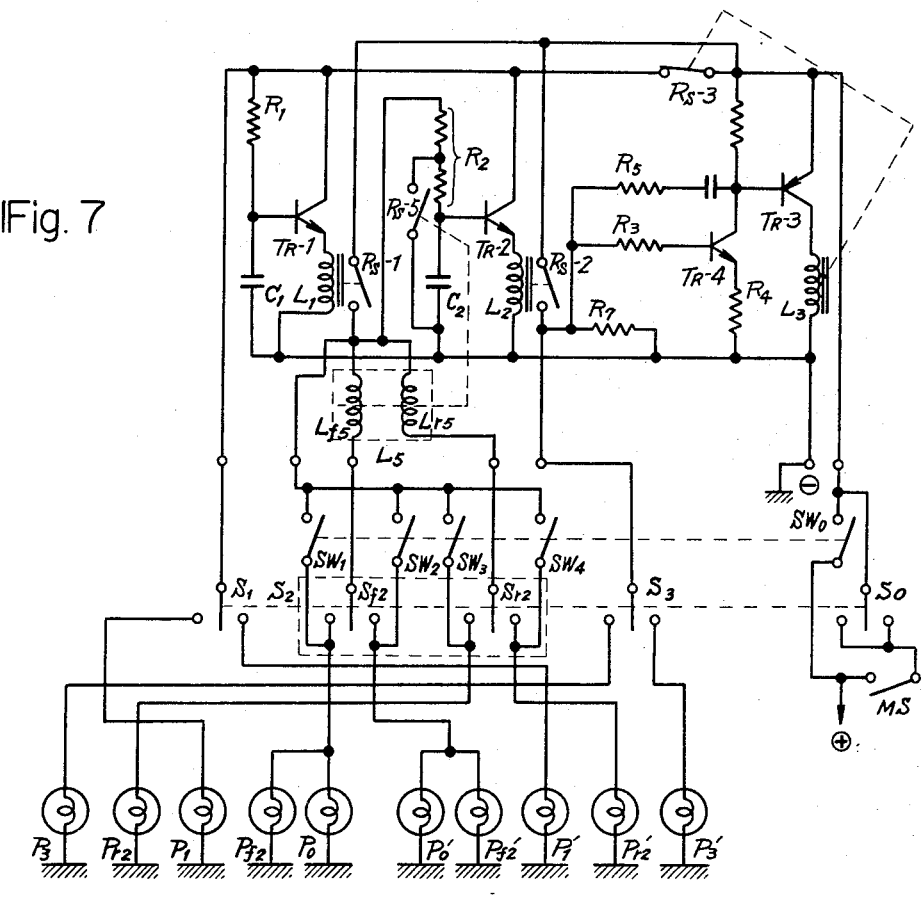
FIG. 7 is a circuit diagram showing an example of a hazard warning circuit utilizing turn signal lamps as used in the circuit arrangement of FIG. 6.

FIG. 7 is a diagram of a hazard warning circuit, which makes use of the above circuit of FIG. 6, where both of rear second lamps Pr2 and Pr2', both of front turn signal lamps Pf and Pf', and inside pilot lamps Po and Po' have current supplied to them by connecting them directly to a power source by means of a power source switch SWo in conjunction therewith. In the drawing MS represents a key switch.

Hazard switches SW1, SW2, SW3, and SW4 for said lamps Pr2, Pr2', Pf2, and Pf2' are provided as ganged switches in parallel with a series circuit formed of change-over switches Sr2 and Sf2 for such lamps and a relay coil L5 (Lr5, Lf5). The power source switch SWo, used as a hazard switch, is connected in parallel with a series circuit consisting of key switch MS and a power source switch So used as a turn signal switch, with a delay circuit 3 and the main control circuit 2 used as a flashing means, so that the lamps Pr2, Pf2, Pr2' and Pf2' may be lit and put out at one time.

In this case, however, no detection of any disconnection in the first or the third lamp system can be made, where no relay for detection is included. In the main control circuit 2 a resistance R7 is included to form a charging route in the CR series circuit. This is because suspension of flashing operation (detection of the breakage of wire) must be prevented at the time of emergency. The pilot lamps Po and Po' are inserted in parallel with the lamps Pf2 and Pf2' which are on the right and left front of a car body.

In FIG. 7 the circuit is also used as a hazard warning circuit, which is formed at once by turning on the hazard switches SW1, SW2, SW3, and SW4 under any circumstances for flashing the lamps Pr2, Pr2', Pf2, and Pf2' all at one time.

As will be apparent from the above embodiments the present invention provides a very simple device in which such oscillators and multivibrators, and flip-flop circuits in combination with complicated relay circuits are not required and which permits easy adjustment and simple maintenance because of rare faulty operation and less trouble.

Furthermore, in case any disconnection occurs in the present device, it can be detected easily by suspension of the flashing operation inside a car and located very quickly.

Still furthermore, the present device can be used as a hazard warning device without additional expense.

As has been described above, the objects of the present invention are accomplished with such great advantages as easy manufacture and low cost, which make the present device very useful and suitable as a device of this nature.

What is claimed is:

1. A sequential flasher type directional signal device for automobiles comprising a right and left turn signal indicator, each consisting of a plurality of lamps in a row and a control circuit means connected in series with a power source and said plurality of lamps for turning said lamps on sequentially one after another, turning them all off at the same time, and reinitiating the cycle to indicate the direction of right and left turns respectively;

said control means comprises;

a plurality of time delay means, one less than the number of said plurality of lamps for a given turn direction, one time delay means is connected in parallel with each lamp, except the last lamp in the sequence for delaying the activation of the next lamp in said sequence in response to the activation of the previous lamp in the sequence;

a plurality of switch means, one in series with each lamp's power input for activating a lamp in response to the preceding lamp's time delay means;

a cycle reset means connected between said power source and the lamp's power input for turning off all the lamps at the same time and restarting the cycle upon the activation of the last lamp;

said cycle reset means comprises a series circuit of a first resistor and a capacitor connected between the last lamp in said sequence and a first switching transistor, a bias resistor connected between the base of said first transistor and the plus side of a power source, the emitter of said first transistor being connected to said plus side of said power source, a relay coil connected between the collector of said first transistor and the minus side of said power source, said base of said first transistor is connected to the collector of a second switching transistor, a base resistor connected between the base of said second transistor and said last lamp in said sequence, an emitter resistor connected between the emitter of said second transistor and said minus side of said power source, and a normally-closed relay contact, which is opened upon energization of said relay coil, is in series between said power source and all of said lamps' power inputs, whereby said capacitor which is initially charged through said bias resistor and holds said first transistor off, is discharged when the last lamp of said sequence is lit and said second transistor conducts and allows said first transistor to conduct to activate said relay to disconnect said power source from said lamps' power inputs.

2. A sequential flasher type directional signal device of claim 1 wherein said control means further includes a disconnection detecting means connected in series with the power source and each lamp's power input for preventing the activation of any subsequent time delay or lamp and consequently preventing said cycle reset means from working; each of said disconnection detecting means comprises a current sensitive relay coil in series with an individual lamp's power input and normally open contacts in series with the input of said time delay means, the last set of normally open contacts are connected to the input of said cycle reset means, and a pilot light connected in parallel to said first lamp, which indicates disconnection by not blinking.

3. A sequential flasher type directional signal device of claim 1, wherein a front lamp is connected in parallel with the second lamp and wherein said control means further includes a disconnection detecting means comprising:

a relay having a coil connected in series with the first lamp circuit, a first set of normally open contacts of said relay being connected in series to the input side of the first delay means, a differential type relay, a first differential coil of which is connected in series with the second lamp circuit on the rear side and a second differential coil of which is incorporated in series connection into the second lamp circuit on the front side, the series circuit consisting of said first differential coil and the second lamp on the rear side and the series circuit consisting of said second differential coil and the front lamp on the front side having power simultaneously fed thereto through a second set of normally open contacts adapted to be closed by said first delay means, a third set of normally open contacts of said differential type relay being connected between the input side of the second delay means and the minus side of a power source, and a pilot light of low power consumption connected in parallel with said first lamp to indicate a disconnection by burning continuously.

* * * * *